(12) United States Patent
Smith et al.

(10) Patent No.: US 9,784,040 B2
(45) Date of Patent: Oct. 10, 2017

(54) OIL RIG PONY SUBSTRUCTURES WITH OUTRIGGER SECTIONS

(71) Applicant: Entro Industries Inc., Hillsboro, OR (US)

(72) Inventors: Shawn R Smith, Hillsboro, OR (US); Harlan B Smith, Hillsboro, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 221 days.

(21) Appl. No.: 14/857,285

(22) Filed: Sep. 17, 2015

(65) Prior Publication Data

US 2017/0081924 A1  Mar. 23, 2017

(51) Int. Cl.
| | | |
|---|---|---|
| *A47G 29/00* | (2006.01) | |
| *E21B 15/00* | (2006.01) | |
| *B62D 57/02* | (2006.01) | |

(52) U.S. Cl.
CPC ............ *E21B 15/003* (2013.01); *B62D 57/02* (2013.01)

(58) Field of Classification Search
CPC ...... F21B 15/003; E21B 15/003; B62D 57/02
USPC .................... 248/544, 694; 52/112
See application file for complete search history.

(56) References Cited

U.S. PATENT DOCUMENTS

| | | |
|---|---|---|
| 1,001,299 A | 8/1911 | Page |
| 1,242,635 A | 10/1917 | Anderson |
| 1,879,446 A | 9/1932 | Page |
| 2,132,184 A | 10/1938 | Poche |
| 2,259,200 A | 10/1941 | Cameron et al. |
| 2,541,496 A | 2/1951 | Busik, Jr. et al. |
| 2,914,127 A | 11/1959 | Ricourd |
| 3,334,849 A | 8/1967 | Bronder |
| 3,362,553 A | 1/1968 | Weinmann |
| 3,576,225 A | 4/1971 | Chambers |
| 3,754,361 A | 8/1973 | Branham et al. |
| 3,921,739 A | 11/1975 | Rich et al. |
| RE29,541 E | 2/1978 | Russell |
| 4,135,340 A | 1/1979 | Cox |
| 4,290,495 A | 9/1981 | Elliston |
| 4,296,820 A | 10/1981 | Loftis |
| 4,324,077 A | 4/1982 | Woolslayer |
| 4,371,041 A | 2/1983 | Becker |
| 4,375,892 A | 3/1983 | Jenkins et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 5,248,005 A | 9/1993 | Mochizuki |
| 5,492,436 A | 2/1996 | Suksumane |
| 5,794,723 A | 8/1998 | Caneer |
| 5,921,336 A | 7/1999 | Reed |
| 6,474,926 B2 | 11/2002 | Weiss |

(Continued)

FOREIGN PATENT DOCUMENTS

CA      2864487 A1 *  8/2013  ............ E21F 13/006

*Primary Examiner* — Gwendolyn Baxter
(74) *Attorney, Agent, or Firm* — J. Curtis Edmondson; Law Offices of J. Curtis Edmondson

(57) ABSTRACT

A pony substructure, for use in supporting substructures of drilling rig operations, which includes two parallel oriented frames and two outriggers attached to each frame. In preparation for transportation to and from drilling rig operations, the outriggers are adapted to rotate about a plurality of pivot points, which then enables each outrigger to fold over the top of each corresponding platform.

17 Claims, 7 Drawing Sheets

(56) References Cited

U.S. PATENT DOCUMENTS

| | | | |
|---|---|---|---|
| 6,554,145 | B1 | 4/2003 | Fantuzzi |
| 6,581,525 | B2 | 6/2003 | Smith |
| 7,182,163 | B1 | 2/2007 | Gipson |
| 7,308,953 | B2 | 12/2007 | Barnes |
| 7,681,674 | B1 | 3/2010 | Barnes et al. |
| 8,250,816 | B2 | 8/2012 | Donnally |
| 8,468,753 | B2 | 6/2013 | Donnally |
| 8,556,003 | B2 | 10/2013 | Souchek |
| 8,887,800 | B2 | 11/2014 | Havinga et al. |
| 9,249,626 | B2 * | 2/2016 | Flusche .................. E21B 7/026 |
| 9,512,676 | B2 * | 12/2016 | Holst ..................... E21B 7/023 |
| 2004/0211598 | A1 | 10/2004 | Palidis |
| 2004/0240973 | A1 | 12/2004 | Andrews et al. |
| 2006/0027373 | A1 | 2/2006 | Carriere |
| 2006/0213653 | A1 | 9/2006 | Cunningham et al. |
| 2009/0200856 | A1 | 8/2009 | Chehade |
| 2009/0283324 | A1 | 11/2009 | Konduc et al. |
| 2011/0114386 | A1 | 5/2011 | Souchek |
| 2012/0167485 | A1 * | 7/2012 | Trevithick .............. E21B 15/00 52/112 |
| 2014/0158342 | A1 | 6/2014 | Smith |
| 2016/0258225 | A1 * | 9/2016 | Holst ..................... E21B 33/06 |

\* cited by examiner

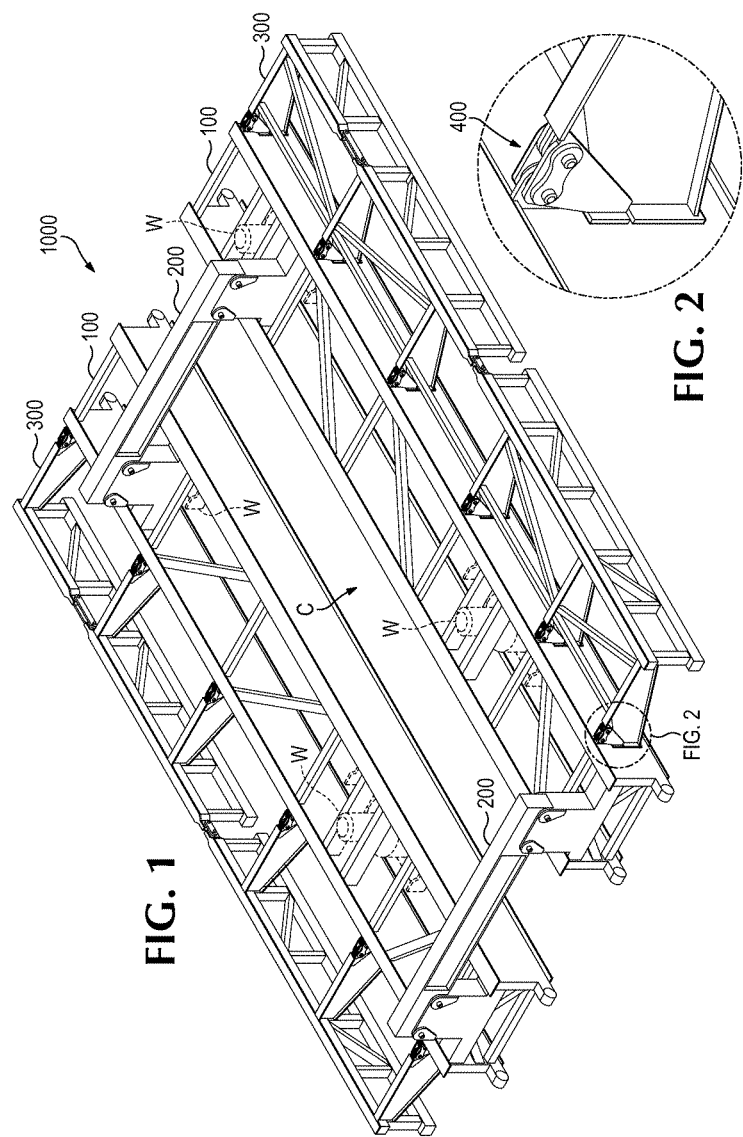

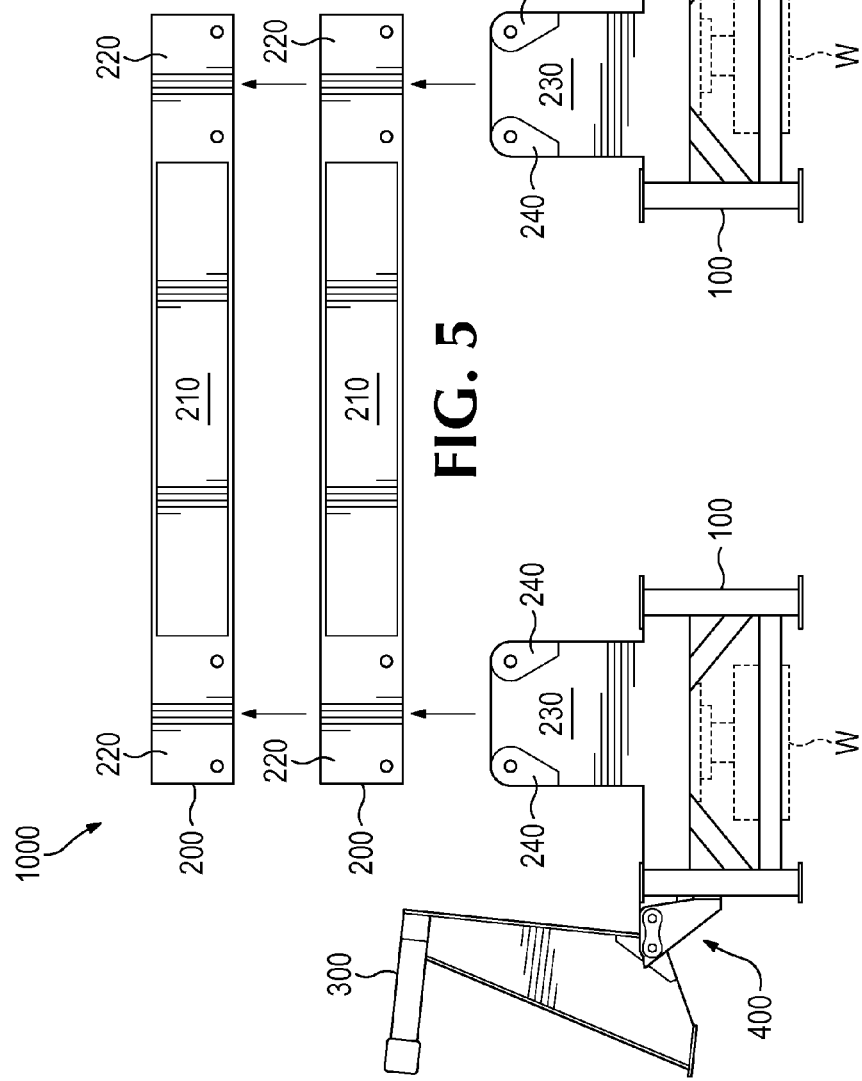

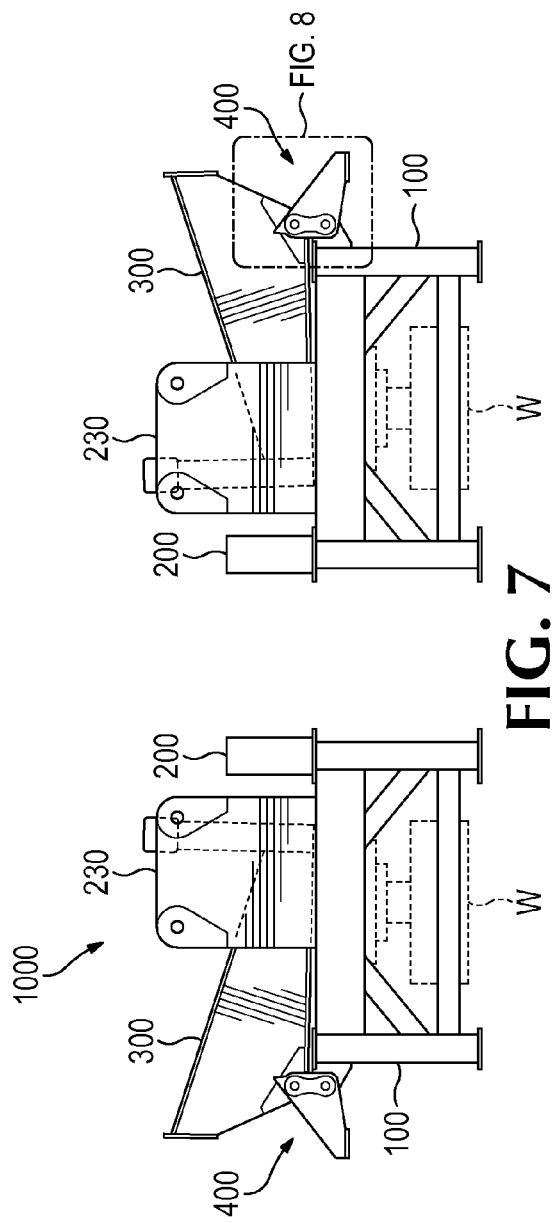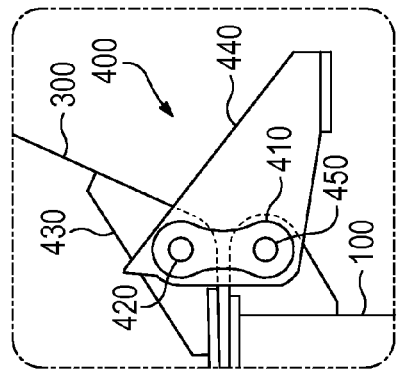

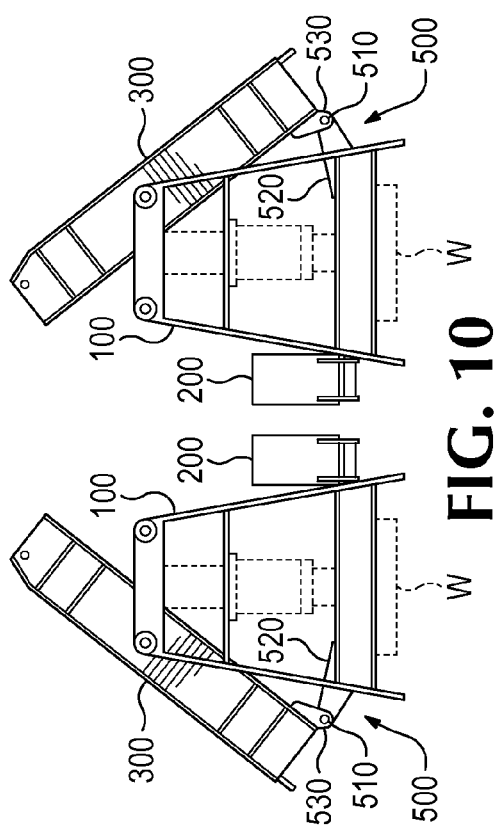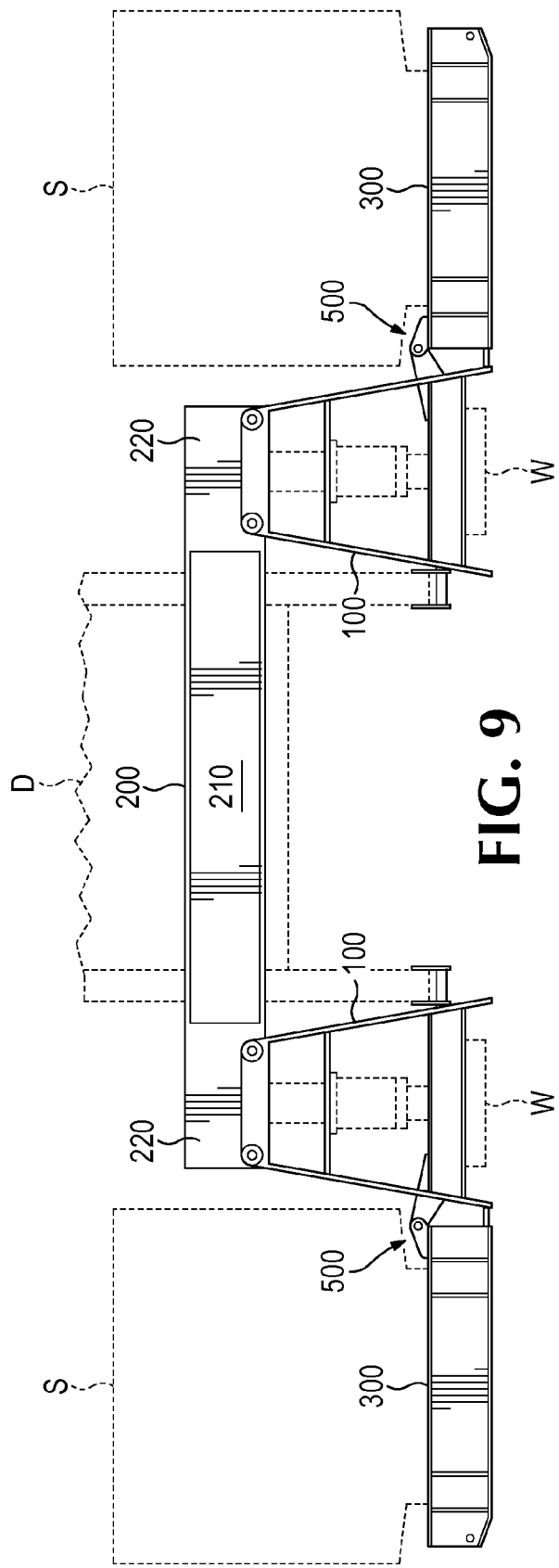

OIL RIG PONY SUBSTRUCTURES WITH OUTRIGGER SECTIONS

BACKGROUND

Field of the Invention

This disclosure is generally directed to oilfield production with above ground completions, and in particular, pony substructures which are useful in drilling operations for oil fields having boreholes within walking distance from one to another. The disclosed pony substructures, through the use of foldable and collapsible outriggers, reduce the number of loads required for hauling and transport from one oilfield to another.

Description of the Related Art

In the oil production industry, drilling rigs are delivered to an oilfield drilling site in what usually requires dozens of loads. Upon arrival at the drilling site, the rig components are assembled and erected for operation. Once drilling is completed, the components are disassembled, loaded back onto trucks and trailers, and hauled to another oilfield drilling site for subsequent operations. Consequently, the entire operation's cost effectiveness is significantly affected by the ease with which the rig's components can be put together and taken apart, and the number of loads required to haul the rig and rig components from one site to another.

The use of substructures is a more recent development within the industry. A substructure is typically, a steel platform that supports the derrick or mast, drawworks, drill floor, doghouse, and rotary table of a drilling rig operation. Substructures, as the foundation of the entire drilling rig operation, are custom manufactured according to the drilling operation's specific needs. There are several types of substructures, including but not limited to self-elevating slingshot; box-on-box; box-in-box; and, swing lift, as well as pony substructures. Pony substructures or pony subs are smaller-sized substructures that, when used with one of the aforementioned substructures, raise the drill floor height on the drilling rig.

Additional developments within the industry are enabling the lifting and lowering of the entire rig and even walking the entire rig from one wellbore, for example, to an adjacent wellbore. The drilling technique known as "pad" drilling, which allows rig operators to drill groups of wells more efficiently, involves drilling a number of wellbores that are positioned and patterned in close proximity to one another. Concentrating the wellbores also helps the producer reduce costs associated with managing the resources above-ground and moving the production to market. During pad drilling, once one well is drilled, the fully constructed rig can be lifted and moved a few yards over to the next wellbore using skidding systems or hydraulic walking systems, as demonstrated by Entro Industries of Hillsboro, Oreg.

The following patents assigned to Entro Industries are incorporated by reference herein in their entireties: U.S. Pat. Nos. 8,490,724; 8,561,733; 8,839,892; 9,004,203; 9,045,178; and U.S. Pat. Appl. Nos. 2013/0156538;

Accordingly, reducing operating costs within the hydrocarbon exploration and development industry is a constant theme continuously being sought by producers. Solutions for reducing operating costs include reducing the number of truck loads required for delivery to and removal from production sites, advancements for enabling shorter rig up/rig down time, and providing mobilization of the entire drilling operation while in rig up mode.

SUMMARY

The present disclosure is generally directed to drilling rig pony substructures used in mobile drilling operations. In one embodiment, a pony substructure includes two platforms oriented in parallel, and two outriggers extending outward from each platform. The pony substructure is adapted to be mobilized for locomotion from wellbore to wellbore with the outriggers in an extending outward configuration. In other embodiments, each outrigger is adapted to rotate between a folded configuration for transportation to and from the drilling rig operations and an extending outward configuration. In some embodiments, each outrigger is adapted to telescopically reposition relative to each platform between a collapsed configuration for transportation to and from the drilling rig operations and an extending outward configuration.

It should be understood that the summary above is provided to introduce in simplified form a selection of examples that are further described in the detailed description. It is not meant to identify key or essential features of any claimed subject matter that may later claim priority to the present description. Furthermore, the scope of any such claimed subject matter would not be limited to implementations that solve any disadvantages noted above or contained herein.

BRIEF DESCRIPTION OF THE DRAWINGS

Many aspects of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is an isometric view showing a pony substructure with foldable outriggers, according to embodiments of the invention.

FIG. 2 is a close up view of a double pivot hinge shown in FIG. 1, according to embodiments of the invention.

FIG. 5 is an end view of the two, parallel pony subs of FIG. 1 with the outriggers in the process of being folded, according to embodiments of the invention.

FIG. 6 is a close up view of the double pivot hinge shown in FIG. 5, according to embodiments of the invention.

FIG. 7 is an end view of the outriggers folded over each of the pony subs shown in FIGS. 1-6, according to embodiments of the invention.

FIG. 8 is a close up view of the double pivot hinge shown in FIG. 7, according to embodiments of the invention.

FIG. 9 is an end view of the pony substructure with single hinge foldable outriggers, according to embodiments of the invention.

FIG. 10 is an end view of the two, parallel pony subs of FIG. 9 with the outriggers having been folded, according to embodiments of the invention.

DETAILED DESCRIPTION

Figure 4:
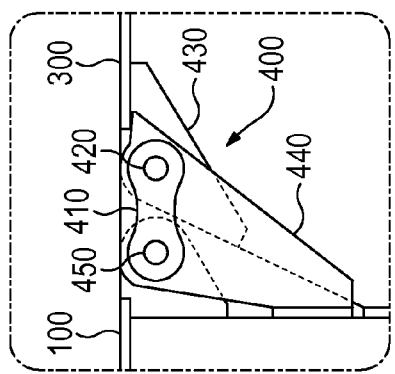
FIG. 4 is a close up view of the double pivot hinge shown in FIG. 3, according to embodiments of the invention.

The embodiments in this disclosure, as illustrated in FIGS. 1 through 14 and described in the text below, are adapted for use in above ground hydrocarbon exploration and/or development. Not only are the embodiments shown in detail herein particularly suited to installations for pad drilling operations, the embodiments are useful for mobilization operations from pad-to-pad, as well.

The term substructure shall mean the steel platform and its supports used to support and elevate equipment used in drilling operations. The substructure provides space below the rig floor. The height of the substructure depends on the size and pressure ratings of the wellhead and blowout-preventer equipment. H-beam, angle iron, and metal plates are used in the construction. The front end is reinforced for the heaviest load. The top is covered with a steel plate to form the dill floor. The substructure is generally about up to 20 feet wide, about up to 10 feet high, and about up 40 feet long. A box-on-box type substructure usually is made of one main base substructure.

The term pony substructure (single unit) shall mean two parallel oriented pony subs used to further elevate the substructure, as defined above. The pony substructure is used to obtain a certain height requirement.

The term pony subs shall mean two platforms which are oriented parallel to each other with 10 to 20 feet spacing connected by cross beams. The platforms are about up to 10 feet wide, about 3 to 6 feet high, and about up to 40 feet long.

With more detailed reference to the drawings, reference numeral label 1000 designates pony substructure 1000, generally. Pony substructure 1000 has two parallel, spaced apart, steel frame, pony subs 100, 100', two cross member beams 200, 200' located near the front and rear end of each pony sub 100, 100', and two outriggers 300, 300' adjacently attached on the lateral side of each pony sub 100, 100'.

Referring to FIG. 1, pony substructure 1000 is depicted as an open frame construction, with two parallel, pony subs 100, 100', and two corresponding outriggers 300, 300'. In between the two pony subs 100, 100' is an open space which is utilized as the rig operation's cellar C.

With continuing reference to FIG. 1, pony substructure 1000 can be used for the moving of the drilling rig between two wellbores, which previously involved disassembling ("rigging down") and reassembling ("rigging up") the rig at the new location, even if the second wellbore was only a few yards away. Walking machinery 4J3500KP, as manufactured by Entro Industries of Hillsboro, Oreg. is an exemplar type of walker or walkers used for relocation from one wellbore to the next, during pad drilling. Other examples of walking machines are as described in U.S. Pat. Nos. 8,490,724; 8,561,733; 8,839,892; 9,004,203; 9,045,178 and U.S. Pat. Appl. Nos. 2013/0156538. Pad drilling allows hydrocarbon producers to target a significant area of underground prospects while minimizing the impact on the surface. The walking machinery 4J3500KP also enables pad-to-pad moves, underscoring the efficiency gains from rig mobility and pad drilling. Entro Industries' walking machinery 4J3500KP provides low ground-bearing pressures under each walking foot and allows the rig to be moved in any direction, as well as spin in place.

The illustrative embodiment as depicted in FIG. 1 shows pony substructure 1000 as two parallel pony subs or platforms 100, 100' that are made up of a pair of side rails with an open interior space between the side rails. The space (cellar) C between the pair of platforms 100, 100' is spanned by beams 200, 200'. The platforms 100, 100' are hinged to outriggers 300, 300' on the lateral side of each platform 100, 100'. In a non-limiting embodiment of FIG. 1, a pair of platforms 100, 100', a pair of beams 200, 200', a pair of outriggers 300, 300', and twelve, double pivot hinge assemblies 400 (See FIG. 2) are shown. Accordingly, it should be understood that in other embodiments, the pony substructure 1000, including the pony subs 100, 100', beams 200, 200', outriggers 300, 300', and hinge assemblies 400 can be custom manufactured to size, shape, and form.

Furthermore, there are six, double pivot hinge assemblies 400 shown with respect to each outrigger 100, 300', as illustrated in FIG. 1. Throughout the present disclosure, when reference is made to the double pivot hinge assembly 400, such reference is intended to include any number of this assembly 400, the number of which may be custom manufactured to specification depending on the size, and particularly, the length of the pony subs 100, 100'.

It should be appreciated by those of ordinary skill that the specific structural configurations, including the width and length of the outriggers 300, as illustrated in FIG. 1 are exemplary only, and that other design configurations may also be used that generally fall with in the spirit and scope of the present disclosure.

Further included in FIG. 1 and with reference to FIG. 2, double pivot hinge assembly 400 or assemblies 400, generally connect each outrigger 300, 300' to each pony sub 100, 100' at points along the length of each pony sub's 100, 100' lateral side. Each outrigger 300, 300' is in an extending outward configuration relative to each outrigger's 300, 300' corresponding pony sub 100, 100'.

Figure 3:
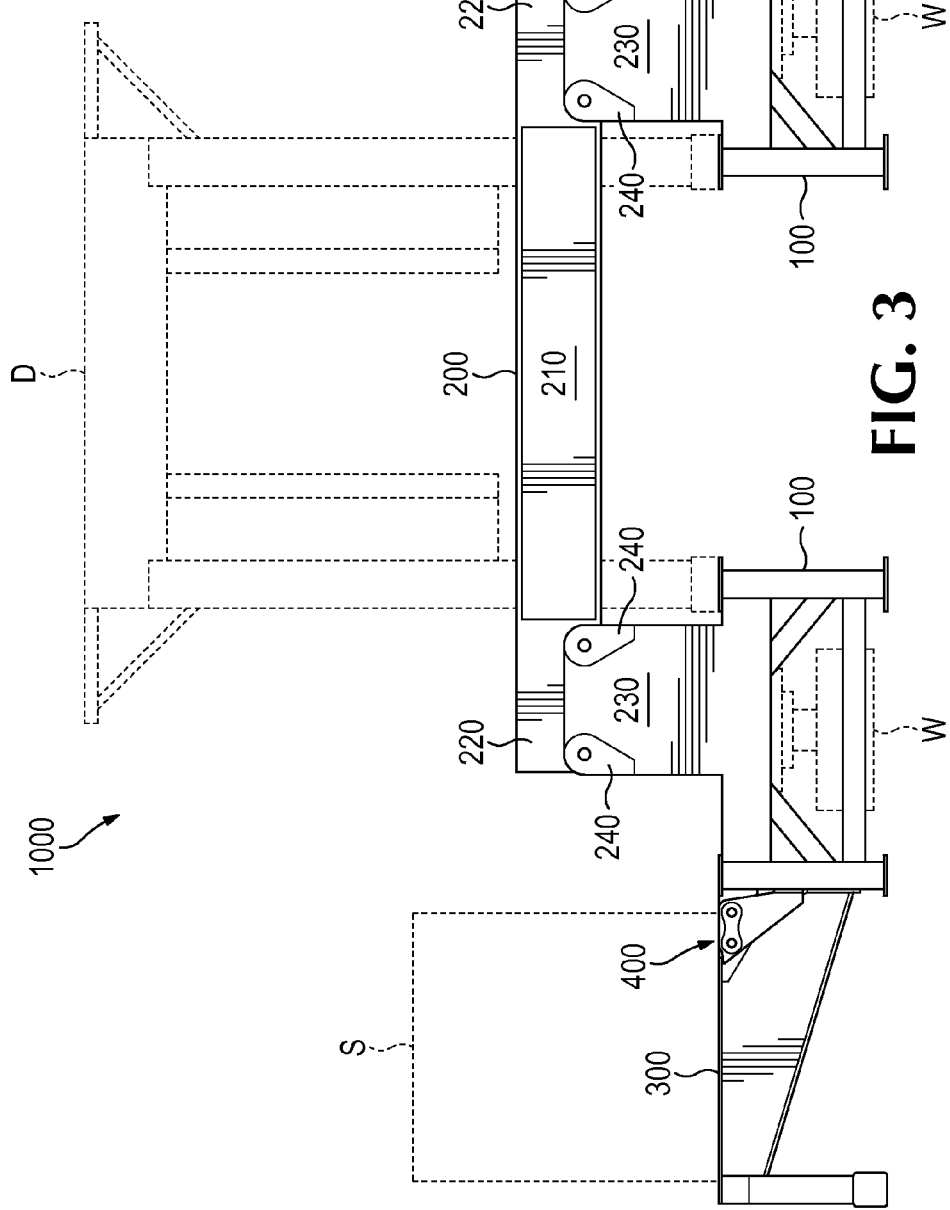
FIG. 3 is an end view of the pony substructure of FIG. 1, according to embodiments of the invention.

Referring to FIG. 3, pony substructure 1000, is shown in rig up operation with substructure D centered on top of beams 200, 200', which traverse pony subs 100, 100' at the front and rear end of the pony substructure 1000. Beams 200, 200' (only one beam at the front end of substructure 1000 is shown in FIG. 3), is constructed with web 210, and flanges 220a and 220b. Web 210 helps to resist shear forces, while the flanges 220a and 220b are known to resist the bending moment experienced during the walk (via walking machinery W). Support frames 230, 230' connect the beams 200, 200' to each platform 100, 100'. Beams 200, 200' and support frames 230, 230', in use with walking machinery W, enable the drilling rig to be "walked" or, in other words, bolts from wellbore to wellbore or from pad to pad in rig up operations. The beams 200, 200' are attached to support frames 230, 230' at bolts 240a, 240b and 240a', 240b', respectively. In this non-limiting embodiment, mobilization can be achieved, despite any unbalanced loads on either side of the pony subs 100, 100' and outriggers 300, 300'.

In another non-limiting embodiment, additional rig components and systems S can be positioned on top of the outriggers 300, 300', as shown in FIG. 3. These systems S may include electrical, circulatory, etc . . . and in particular, such components as mud tanks, shakers, doghouses, and water tanks, to name a few. In certain embodiments, any or all systems S that may be required for the drilling operation may also be positioned for attachment to and/or installation on either one or both of the outriggers 300, 300'.

With respect to other non-limiting embodiments, power system X includes controls for providing power via connection hoses (not shown) to walking machinery W. It should be appreciated by a person of ordinary skill in the art that the configuration of the substructure D, systems S, and X shown in FIG. 3 are exemplary only, and that other position placement configurations may also be used. X is designed to rest inside or nest within the open interior space of pony subs 100, 100' to allow the outriggers 300, 300' to be folded over the top of each pony sub 200, 200', which will be described with reference to FIGS. 5-8. Furthermore, the pony substructure's 1000 design and form enables rigging up and placement of the systems S and X without the use of large, heavy-lifting cranes.

Also included in FIG. 3 and with reference to FIG. 4, the double pivot hinge assembly 400 is illustrated. In a non-limiting embodiment, an exemplar double pivot hinge assembly 400 includes a central pivot link 410 constructed within bracket 440. The central pivot link 410 includes an exterior pivot pin 420, which enables the outrigger 300 to rotate from 0 to approximately 90 degrees about the platform 100. Central pivot link 410 further includes interior pivot pin 450, which enables bracket 440 to rotate from 0 to approximately 90 degrees about the platform 100. Bracket 440 connects the platform 100 to the outrigger 300 at the interior pivot pin 450. Plate 430 connects the outrigger 300 to the bracket 440 at exterior pivot pin 420.

Next, referring to FIGS. 5-8, the double pivot hinge assembly 400 functions as a double pivot point thereby enabling the outrigger 300 to be moved rotationally about the platform 100. As a result, the outrigger 300 can be folded on top of the platform 100. FIGS. 5 and 6 show an exemplar substructure 1000 with the pair of outriggers 300, 300' pivoted via exterior pivot pin 420 (only one exterior pivot pin 420 is shown in FIG. 6). Next, FIGS. 7 and 8 show the pair of outriggers 300, 300' pivoted via the interior pivot pin 450 (only one interior pivot pin 450 is shown in FIG. 8).

In a non-limiting operation, outriggers 300, 300' can be rotated approximately 180 degrees about each respective pony sub 100, 100', resulting in a folded configuration (FIG. 7) which allows each of the two pony subs 100, 100' and folded up outriggers 300, 300' to be trailered and hauled in a maximum of two loads. As shown in FIG. 7, the folded configuration results in a doubling of the height of the pony substructure 1000. The folded configuration results in a significant reduction in the total width of the pony subs 100, 100' and outriggers 300, 300' from the rig up, extended configuration. Consequently, the width of the load to be hauled is reduced, as well. When the folded configuration is loaded on a trailer, usually a low-boy type trailer, in preparation for road or highway transportation, the resultant width of the folded configuration is adapted to substantially comply with most width restrictions, even avoiding wide load restrictions that may typically be imposed during such transportation.

With continuing reference to FIGS. 5-8, beams 200, 200' are also designed to be dismounted from their corresponding support frames 230, 230' (FIG. 5) and stowed along the inner-side (FIG. 7) of each pony sub 100, 100' in preparation for hauling and transport.

Figure 11:
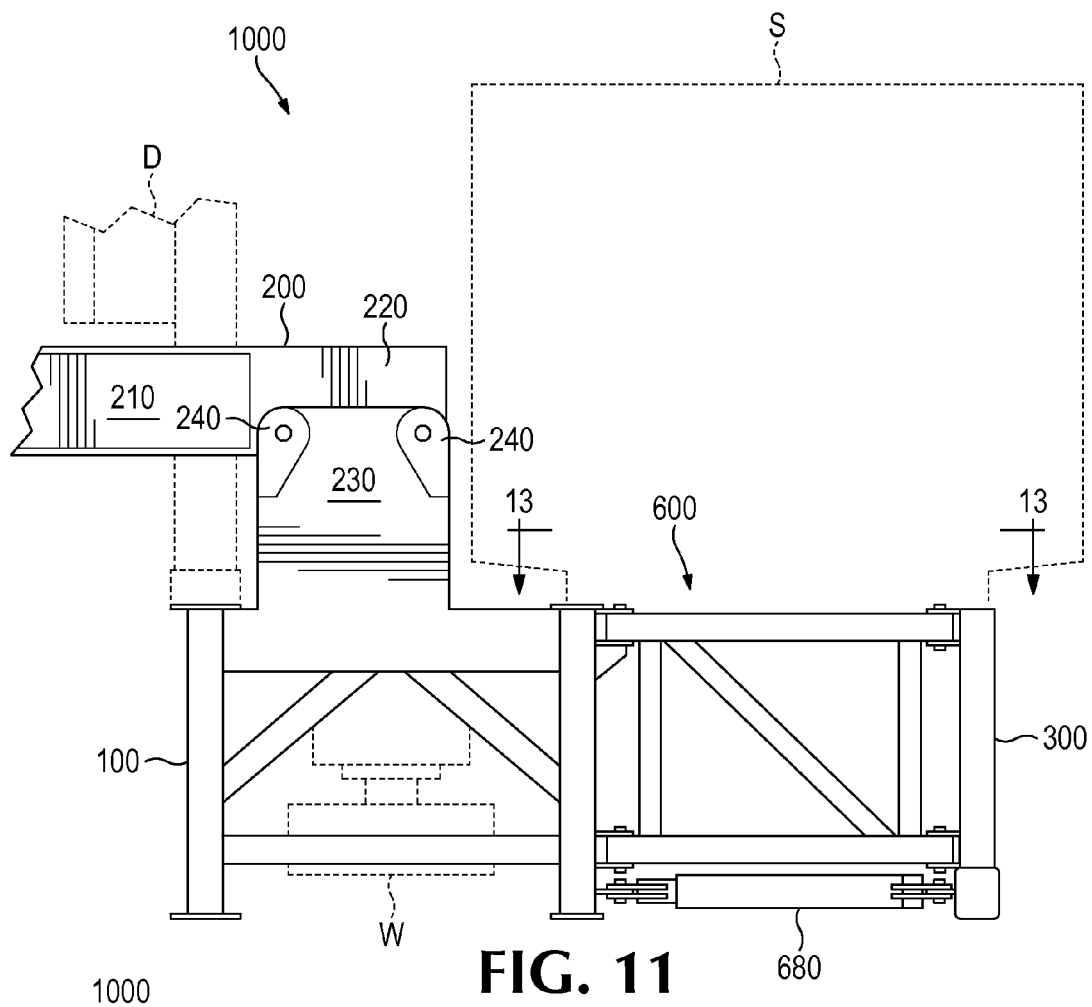
FIG. 11 is an end view of a single pony sub with a collapsible outrigger, according to embodiments of the invention.

Next, FIGS. 10 and 11 show another non-limiting embodiment, in which the outriggers 300, 300' can be partially folded to stow atop the pony subs 100, 100' via a single hinge assembly 500. The single hinge assembly 500 includes a frame arm 520 which extends laterally from each pony sub 100, 100', a pivot pin 510 at the end of the frame arm 520, and a an outrigger arm 530 connected to the pivot pin 510 on one end and each outrigger 300, 300' on the other end. In this embodiment, as in previously described embodiments, the pony subs 100, 100' and outrigger 300, 300' pairings can be trailered and hauled in a maximum of two loads. As shown in FIG. 10, the partially folded configuration also results in a reduction in the total width that is otherwise shared by each pony sub 100, 100' and outrigger 300, 300' together during rig up. As illustrated in FIGS. 9 and 10, the partially folded configuration may be used for transportation when clearance height during transportation is not a factor or does not need to be considered.

Also, in a non-limiting embodiment, beams 200, 200' are also designed to be stowed along the medial side rail (FIG. 10) of each pony sub 100, 100' in preparation for hauling and transport.

Figure 12:
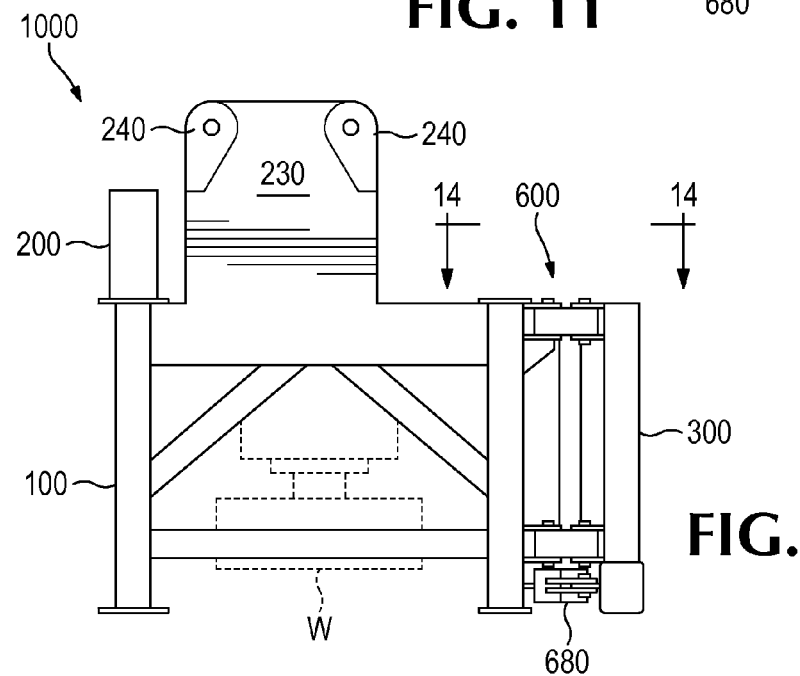
FIG. 12 is an end view of the outrigger having been collapsed to the lateral side of the single pony sub shown in FIG. 11, according to embodiments of the invention.

Referring to FIGS. 11 and 12, a non-limiting, partial view of an exemplar pony substructure 1000 is illustrated. In some embodiments, the outriggers 300, 300' can be collapsed via a collapsible assembly 600 to stow against the lateral side of each corresponding pony sub 100, 100'. As shown in FIG. 11, during rig up operations, the outrigger 300 is extended outwardly from platform 100. In FIG. 12, the outrigger 300 is collapsed against the lateral side of the platform 100.

Figure 13:
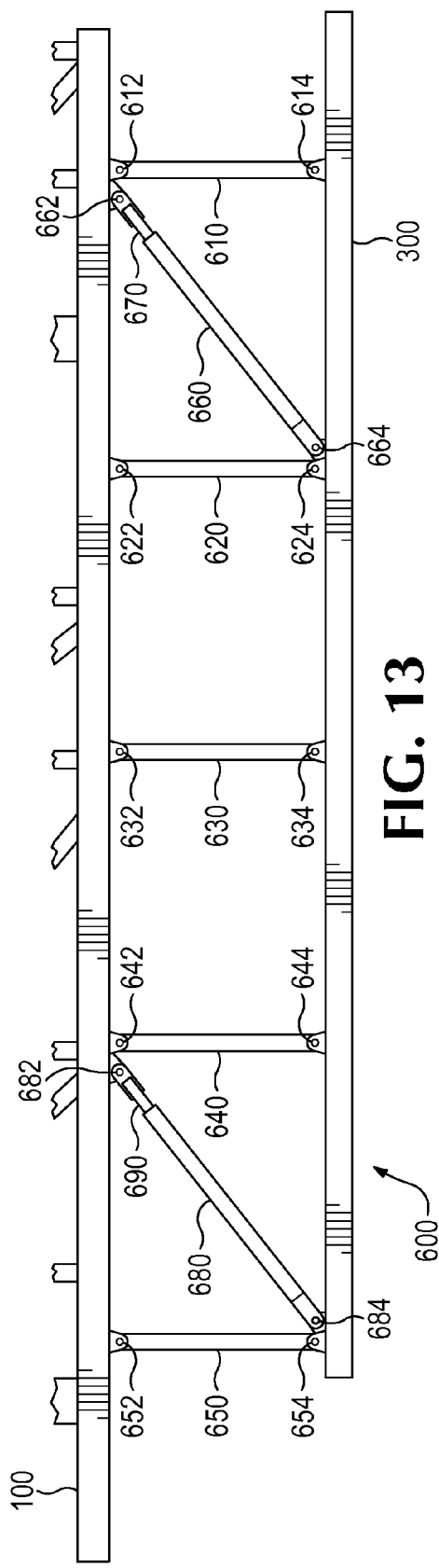
FIG. 13 is a top plan view of the outrigger shown in FIG. 11, according to embodiments of the invention.
Figure 14:
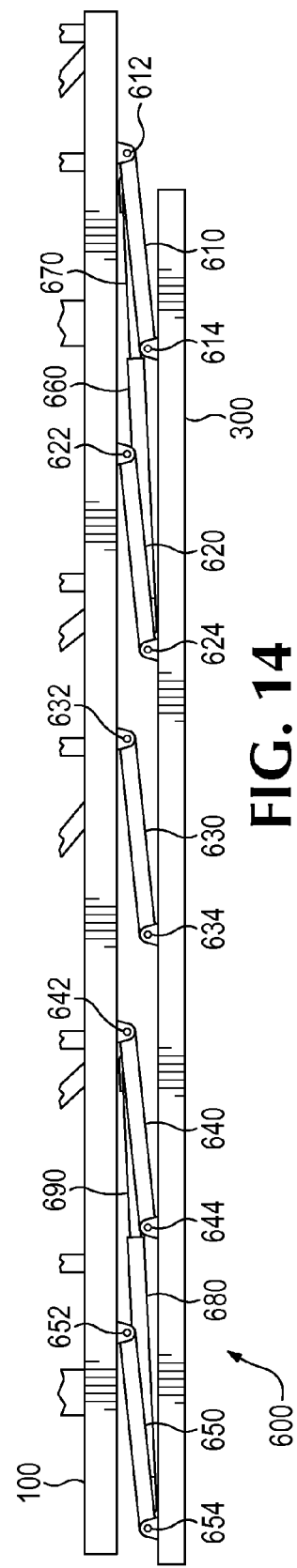
FIG. 14 is a top plan view of the outrigger shown in FIG. 12, according to embodiments of the invention.

With continuing reference to FIGS. 11 and 12 and referring to FIGS. 13 and 14, collapsible assembly 600 includes cross members 610, 620, 630, 640, and 650, which extend horizontally between the lateral side of pony sub 100 and the outside rail that forms the outermost edge of the outrigger 300. Only one of the two pairings of pony sub 100 with outrigger 300 is shown for illustrative purposes in FIGS. 11-14. Each cross member 610, 620, 630, 640, and 650 connects to the pony sub 100 and outrigger 300 by way of corresponding cross pins 612, 614 and 622, 624 and 632, 634 and 642, 644 and 652, 654.

Diagonal members 660 and 680 are attached with cross pins 662, 664 and 682, 684, respectively. As shown in FIGS. 11-14, diagonal members 660 and 680 span diagonally between each pony sub 100, 100' and each outrigger 300, 300'. Each diagonal member 660 and 680 also houses an extension arm 670 and 690, respectively. Operating in concert, the components; e.g., cross members 610, 620, 630, 640, and 650; cross pins 612, 614 and 622, 624 and 632, 634 and 642, 644 and 652, 654; diagonal members 660 and 680; and, corresponding cross pins 662, 664 and 682, 684 of the collapsible assembly 600 provide an extending means for telescopically extending and collapsing each outrigger relative to each frame between a collapsed configuration for transportation to and from the drilling rig operation and an extending outward configuration for drilling or rig up operations.

In at least some embodiments, the collapsible assembly 600 could be operational by way of hydraulic and pneumatic cylinders, screw and gear mechanisms, chain and sprocket arrangements, or cable and pulley/roller arrangements or the like.

It should be appreciated by those of ordinary skill that the specific structural configurations of the outrigger 300 illustrated in FIGS. 11-14 are exemplary only, and that other design configurations may also be used that generally fall with in the spirit and scope of the present disclosure.

The instant invention may be embodied in other forms or carried out in other ways without departing from the spirit or essential characteristics thereof. The present disclosure is therefore to be considered as in all respects illustrative and not restrictive, the scope of the invention being indicated by the appended claims, and all equivalency are intended to be embraced therein. One of ordinary skill in the art would be able to recognize equivalent embodiments of the instant invention and be able to practice such embodiments using the teaching of the instant disclosure and only routine experimentation.

What is claimed is:

1. A pony substructure for use in supporting substructures of drilling rig operations, comprising:
   two platforms oriented parallel to each other with spacing there between, the platforms connected by beams;
   two outriggers extending outward from each platform, each outrigger connected to each platform on a lateral side of each platform;
   a plurality of hinges for axial rotation, wherein each hinge of the plurality of hinges includes an exterior pivot point and an interior pivot point for rotating each said outrigger relative to each platform.

2. The pony substructure of claim 1, wherein the rig operations are mobilized for locomotion from a first wellbore to at least a second wellbore.

3. The pony substructure of claim 1, wherein each said outrigger is adapted to rotate approximately 180 degrees relative to each said platform between a folded configuration for transportation to and from the drilling rig operations and an extending outward configuration.

4. The pony substructure of claim 3, wherein each exterior pivot point of each said hinge has a rotational freedom of 0 degrees to about 90 degrees of a total amount of rotation of approximately 180 degrees.

5. The pony substructure of claim 4, wherein each interior pivot point of each said hinge has a rotational freedom of 0 degrees to about 90 degrees of the total amount of rotation of approximately 180 degrees.

6. The pony substructure of claim 1, wherein each beam is adapted to be detached from each said platform and stowed on a top side of an inner side of each said platform for transportation to and from the drilling rig operations.

7. The pony substructure of claim 1, further comprising:
   said plurality of hinges, wherein each said hinge of the plurality of hinges includes a single pivot point for rotating each outrigger.

8. The pony substructure of claim 7, wherein each said outrigger is adapted to rotate between about 90 degrees to about 180 degrees relative to each said platform between a partially folded configuration for transportation to and from the drilling rig operations and the extending outward configuration.

9. The substructure of claim 1, further comprising:
   extending means for telescopically extending and collapsing each outrigger relative to each platform between a collapsed configuration for transportation to and from the drilling rig operations and the extending outward configuration.

10. A drilling rig pony substructure, comprising:
    a first platform adapted to be trailered and transported to and from a drilling rig operation,
    the first platform comprising:
    a detachable beam positioned on a top side of an inner side of the first platform;
    a plurality of hinges positioned along a length of a lateral side of the first platform; and,
    an outrigger connected to the hinges and positioned on the top side of the first platform;
    a second platform adapted to be trailered and transported to and from a drilling rig operation,
    the second frame comprising:
    a detachable beam positioned on a top side of an inner side of the second platform;
    a plurality of hinges positioned along a length of a lateral side of the second platform; and,
    an outrigger connected to the hinges and positioned on the top side of the second platform.

11. The drilling rig pony substructure of claim 10, wherein the first platform is capable of being transported in a single load to and from the drilling rig operation.

12. The drilling rig pony substructure of claim 10, wherein the second platform is capable of being transported in a single load to and from the drilling rig operation.

13. The drilling rig substructure of claim 10, wherein each outrigger is adapted to unfold from the top side of each of the first and second platform into an extending outward configuration.

14. A drilling rig pony substructure, comprising:
    a first platform adapted to be trailered and transported to and from a drilling rig operation,
    the first platform comprising:
    a detachable beam positioned on a top side of an inner side of the first platform;
    an outrigger adapted to be telescopically collapsed against a lateral side of the first platform during transport;
    a second platform adapted to be trailered and transported to and from a drilling rig operation,
    the second frame comprising:
    a detachable beam positioned on a top side of an inner side of the second platform;
    an outrigger adapted to be telescopically collapsed against a lateral side of the second frame during transport.

15. The drilling rig pony substructure of claim 14, wherein the first platform is capable of being transported in a single load to and from the drilling rig operation.

16. The drilling rig pony substructure of claim 14, wherein the second platform is capable of being transported in a single load to and from the drilling rig operation.

17. The drilling rig substructure of claim 14, wherein each outrigger is adapted to telescope from the lateral side of each of the first and second platforms into an extending outward configuration.

* * * * *